United States Patent
Huschke

(10) Patent No.: US 8,064,375 B2
(45) Date of Patent: Nov. 22, 2011

(54) TECHNIQUE FOR ASSIGNING MULTICAST GROUP MEMBERS TO RADIO NETWORK CALLS

(75) Inventor: Jorg Huschke, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 489 days.

(21) Appl. No.: 11/722,262

(22) PCT Filed: Dec. 22, 2004

(86) PCT No.: PCT/EP2004/014619
§ 371 (c)(1), (2), (4) Date: Nov. 6, 2009

(87) PCT Pub. No.: WO2006/066605
PCT Pub. Date: Jun. 29, 2006

(65) Prior Publication Data
US 2010/0039976 A1    Feb. 18, 2010

(51) Int. Cl.
*H04H 20/71* (2008.01)
*H04W 4/00* (2009.01)
(52) U.S. Cl. .................. 370/312; 370/328; 455/450
(58) Field of Classification Search .................. None
See application file for complete search history.

(56) References Cited

U.S. PATENT DOCUMENTS

| | | | | |
|---|---|---|---|---|
| 2003/0022683 A1* | 1/2003 | Beckmann et al. | ............ | 455/518 |
| 2003/0060216 A1* | 3/2003 | Kamel et al. | .................. | 455/457 |

OTHER PUBLICATIONS

Il Han et al "An Efficient Channel Allocation Scheme for Multicast Traffic in Multitier Cellular Systems" IEICE Transactions on Communications, Apr. 2001, E84-B(4), 1087-93.
Gunnar Bark "Adaptive cell load sharing in WCDMA" Ericsson internal report No. ERA/SVZ/R-01:015; Sep. 2001.

* cited by examiner

*Primary Examiner* — Kevin C Harper

(57) ABSTRACT

Inter-cell handover (or cell reselection) in order to provide load balancing in wireless networks, in particular in hierarchical (overlay) networks, wherein the mobile stations in the cells are associated to different multicast groups. A technique for assigning one or more members of a multicast group to cells of radio network is described. This technique includes determining among multicast group members in a first cell one or more first group members having the highest resource demand in this cell. Next, for each cell of a cell cluster and in relation to a second group member having the highest resource demand in the considered cell, the relative resource consumption increase if the one or more first group members were assigned to said considered cell is determined. This determination is also carried out for the first cell but disregarding the one or more first group members having the highest resource demand. These one or more first members are then assigned to the cell that is associated with a minimum compensated relative resource consumption increase or a minimum compensated relative resource increase. In one embodiment, the cells are hierarchically structured and the assignment of member of the multicast group cells is allowed to be carried out on different hierarchy layers.

17 Claims, 2 Drawing Sheets

100

DETERMINE AT LEAST ONE FIRST MEMBER HAVING THE HIGHEST RESOURCE DEMAND AMONG THE MULTICAST GROUP MEMBERS IN A FIRST CELL
— 102

DETERMINE FOR EACH CELL OF A CELL CLUSTER AND IN RELATION TO A SECOND GROUP MEMBER HAVING THE HIGHEST RESOURCE DEMAND IN THIS CELL, THE RELATIVE RESOURCE INCREASE ASSOCIATED WITH THE ASSIGNMENT OF THE AT LEAST ONE FIRST MEMBER TO THIS CELL
— 104

ASSIGN FIRST MEMBER TO CELL ASSOCIATED WITH MINIMUM (COMPENSATED) RELATIVE RESOURCE INCREASE
— 106

TECHNIQUE FOR ASSIGNING MULTICAST GROUP MEMBERS TO RADIO NETWORK CALLS

FIELD OF THE INVENTION

The invention relates to a technique for assigning members of a multicast group to cells of a radio network. More specifically, the invention relates to an assignment technique for multicast group members that increases the network capacity.

BACKGROUND OF THE INVENTION

Multicast is the simultaneous delivery of information to a set of network destinations that form a multicast group. By comparison with multicast, conventional point-to-single-point delivery is called unicast, whereas delivery to every node of the network is broadcast.

Modern cellular networks provide the capability to support multicast services such as voice conferences and video conferences. In general, a particular multicast service may very efficiently serve the members of a multicast group over a single channel if the members are all located in a single cell. However, In many cases it is not possible or not feasible to locate all members in a single cell. Moreover, in cellular networks (and in particular in networks having a hierarchical cell structure, also called multitier cellular networks) a member of a multicast group may often belong to one of several spatially overlapping and/or hierarchically related cells. In such situations, techniques are useful for assigning the multicast group members such that the network capacity is increased (e.g., in terms of the number of multicast groups that can be served by the network).

Assignment techniques for spatially overlapping or spatially adjacent cells are often defined in so called hand-over schemes. Such hand-over schemes are specifically tailored for unicast services and are therefore not (or not readily) applicable to multicast services.

One exemplary assignment technique for networks having a hierarchical cell structure is described in Il Han et al. "An Efficient Channel Allocation Scheme for Multicast Traffic in Multitier Cellular Systems", IEICE Transactions on Communications, April 2001, E84-B(4), 1087-93. The technique proposed by Il Han et al. relates to a two layer hierarchy with microcells and macrocells, each macrocell including a plurality of microcells. A term "microcell group size" is introduced that specifies the number of microcells in which members belonging to a particular multicast group exist. Assuming that the members of the multicast group that are located in a single microcell are served via a single channel, the number of channels needed for serving the multicast group equals the microcell group size. If all members of the multicast group were located in a macrocell, only a single channel would be needed. However, if only macrocells provide the multicast service, significant capacity decreases may occur.

According to the technique proposed by Il Han et al., all members of a multicast group are assigned to either a macrocell or a microcell depending on the microcell group size. The group members are all assigned to a macrocell if the microcell group size would exceed a predefined threshold parameter. Otherwise, microcell channels are allocated to all group members. Although this decision mechanism can be implemented quite easily, setting of the threshold parameter is a difficult task in scenarios with varying network traffic.

It will be appreciated that there remains a need for flexibly assigning multicast group members to radio network cells such that network capacity is increased.

SUMMARY OF THE INVENTION

According to one aspect of the invention, a method of assigning one or more members of a multicast group to cells of a radio network is provided, which comprises the steps of determining among multicast group members in a first cell one or more first group members having the highest resource demand in the first cell, determining for each cell of a cluster of cells, including the first cell but disregarding the one or more first group members therein, and in relation to a second group member having the highest resource demand in the considered cell, the relative resource increase if the one or more first group members were assigned to this cell, and assigning the one or more first group members to the cell that is associated with a minimum relative resource increase or a minimum compensated (e.g., weighted) relative resource increase.

The cells of the cell cluster for which the relative resource increase is determined may be a sub-set of the total cells of the radio network. The cell cluster may include such cells to which the one or more first group members (that were determined in the initial step) could potentially be assigned. The cells of the cell cluster can (but need not) include neighbouring cells.

The invention may be practised in context with a variety of different cell structures. According to one variant, the cells are hierarchically structured in accordance with an arbitrary number of hierarchy layers. The hierarchy layers may include two or more of a picocell layer, a microcell layer, and a macrocell layer (ordered by increasing cell size). In the case of hierarchically structured cell layers, the assignment of multicast group members to cells may be performed such that individual members of the multicast group are assigned to cells on different hierarchy layers. In other words, the multicast group may stretch over two or more hierarchy layers. However, the assignment of multicast group members may also be confined to a single hierarchy layer.

According to a further cell structuring variant, that may be combined with the hierarchical cell structuring approach discussed above, the cells may be spatially overlapping. In such a scenario, the assignment may be performed in relation to (at least) such group members that are located in overlapping regions to decide to which one of two or more overlapping cells a particular group member is to be assigned.

The invention may be performed in an initial assignment phase in which at least one group member (and preferably all group members) have not yet been assigned to any cell. Alternatively, the method may be performed during a re-assignment phase following an initial assignment of the multicast group members to cells of the radio network. The re-assignment phase may be performed only once after the initial assignment, repeatedly (e.g., at predetermined points in time or depending on one or more parameters indicative of a cell load or a network load) and/or when a member of the multicast group triggers a location update.

If the invention is practised in context with an initial assignment of the one or more first group members to individual cells, the method may be performed under the assumption that the one or more first group members have not yet been assigned to any cell. In such a case the method may start with determining the one or more first group members that need to be newly assigned. For each cell of a cell cluster, and in relation to a second group member having the highest resource demand in this cell, the relative resource increase if the one or more new group members were assigned to this cell may be determined next. Thereafter, the one or more new group members may be assigned to the cell that is associated with a minimum relative resource increase or a minimum compensated relative resource increase.

In the case the invention is practised in context with a re-assignment of the one or more first group members, the relative resource increase in the first cell associated with the one or more first group members may be determined in relation to the second group member having the second highest resource demand in the first cell (i.e., having the highest resource demand in the first cell after the one or more first group members).

There exist several approaches for determining the relative resource increase (which may also be zero) associated with assigning the one or more first group members to a particular cell. According to one approach, the relative resource increase is determined as the difference in the considered cell between the resource demand of the one or more first group members and the resource demand of the second group member. The resource demand may for example be derived from a path gain or a base station transmit power associated with a particular group member or a particular set of group members. If the method is performed for a set of group members, the step of determining the relative resource increase and the step of assigning the group member set may be performed taking into account the total relative resource increase associated with this set.

In one embodiment of the invention, the step of determining the one or more first group members having the highest resource demand among the multicast group members in the first cell additionally comprises constructing a set of two or more first group members. The set of first group members may be constructed in various ways. In one exemplary scenario, the group member set includes the at least one first group member having the highest resource demand in the first cell and one or more additional group members. The additional group members included in the set may be chosen as the group members having the next highest resource demands in the first cell and being associated with a relative resource increase that does not exceed the resource increase associated with the first group member having the highest resource demand in the first cell.

As has been mentioned above, the one or more first group members may be assigned to the cell associated either with a minimum relative resource increase or a minimum compensated relative resource increase. Accordingly, the method may comprise the further step of determining a compensated relative resource increase associated with the assignment of the one or more first group members to a particular cell. The compensated relative resource increase may be calculated from the relative resource increase and a compensation parameter. The compensation parameter may be set for each cell individually in accordance with a large variety of control strategies. According to one variant, the compensation parameter is set to control group member distribution across the individual cells in a more sophisticated way than simply relying on the mere relative resource increase. Preferably, the compensation parameter is set adaptively such that cell blocking phenomena (resulting, e.g., from assigning too many multicast groups or multicast group members to a particular cell) are prevented or at least reduced.

In one embodiment, the step of determining the one or more first group members having the highest resource demand among the multicast group members in the first cell comprises ranking the group members according to their resource demand in the first cell. Such a ranking step may be performed for the other cells also.

The method may be performed repeatedly (e.g., in the form of a loop) so that all possible assignment combinations may be considered and the most favourable assignment scheme (e.g., in terms of a maximized network capacity) can be found. In such a repetitive context the method may be repeatedly performed in an (inner) loop for further individual first group members or sets of first group members in the first cell in the order of decreasing resource demands. This means that once the one or more first group members having the highest resource demand in the first cell have been assigned, one or more further first group members having the next highest resource demand among the remaining (i.e., not yet assigned or not yet re-assigned) multicast group members in the first cell are determined and subjected to an assignment procedure as described above. This repeated assignment of multicast group members Initially assigned to the first cell may be performed for every group member assigned to the first cell or only for those group members that satisfy certain conditions (e.g., only for those that would actually lead to an overall resource decrease if assigned to any other cell).

Once the assigned procedure has been concluded for a particular cell, the method may be repeated for one or more remaining cells in relation to individual group members or sets of group members included therein. To this end, an (outer) loop may be provided in addition to the inner loop which repeatedly performs the method for individual group members or sets of group members of one or more further cells.

The invention may be implemented as software, as a piece of hardware, or as a combination thereof. As regards a software implementation, the method may be embodied in a computer program product comprising program code portions for performing the steps of the method described herein when the computer program product is run on one or more computing devices.

According to another variant, the invention is embodied in an apparatus for assigning one or more members of a multicast group to cells of a radio network. The apparatus comprises a first determination unit with program code portions for determining among the multicast group members in a first cell one or more first group members having the highest resource demand in the first cell, a second determination unit with program code portions for determining for each cell of a cluster of cells, including the first cell but disregarding the one or more first group members therein, and in relation to a second group member having the highest resource demand in the considered cell, the relative resource increase if the one or more first group members were assigned to this cell, and an assignment unit with program code portions for assigning the one or more first group members to the cell associated with a minimum relative resource increase or a minimum compensated relative resource increase.

BRIEF DESCRIPTION OF THE DRAWINGS

In the following the invention will be described with reference to exemplary embodiments illustrated in the Figures, in which:

FIG. 1 is a flow chart showing the individual steps of a method embodiment of the present invention;

DETAILED DESCRIPTION OF PREFERRED EMBODIMENTS

Figure 2:
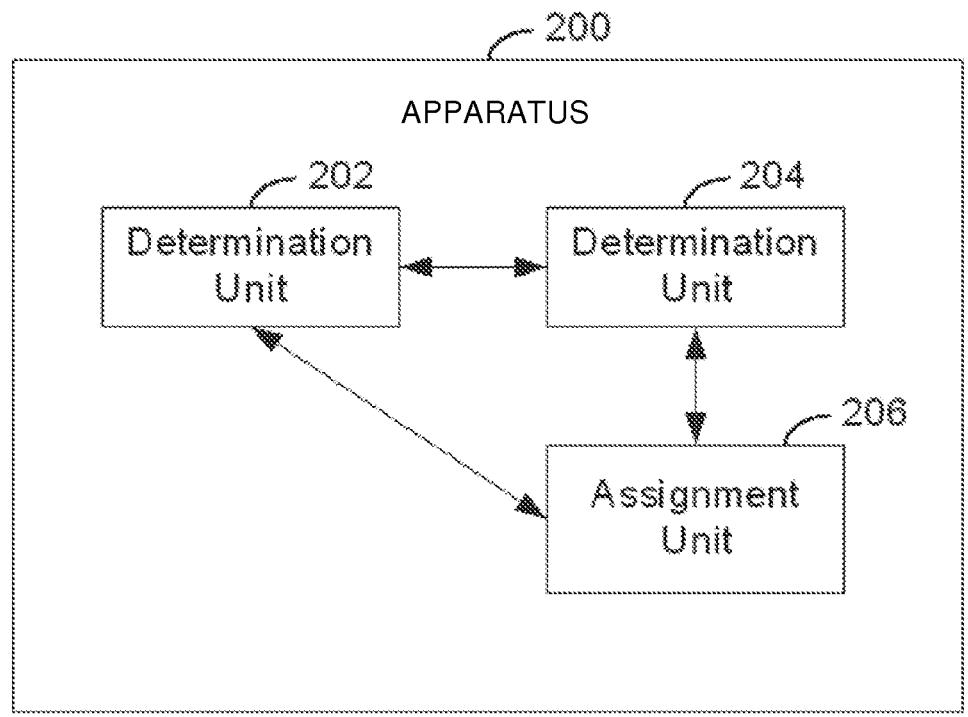
FIG. 2 is a block diagram showing the components of an apparatus embodiment of the present invention.

In the following description, for purposes of explanation and not limitation, specific details are set forth, such as particular cell structures and particular mechanisms for determining resource demands, resource increases, compensation parameters, etc. in order to provide a thorough understanding of the current invention. It will be apparent to one skilled in the art that the current invention may be practised in other embodiments that depart from these specific details. For example, the skilled artisan will appreciate that the current invention may be utilized in connection with other (hierarchical or non-hierarchical) cell structures, different resource determination mechanisms, and the like.

Moreover, those skilled in the art will also appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs). It will also be appreciated that while the current invention is primarily described as a method, it may also be embodied in a system or in an apparatus comprising a computer processor and a memory coupled to the processor, wherein the memory is encoded with one or more programs that may perform the methods disclosed herein.

FIG. 1 discloses a flow chart 100 of a method for assigning one or more members of a multicast group to cells of a radio network operating, for example, according to a WCDMA standard or a GPRS standard. The methods starts, in step 102, with determining at least one first group member having the highest resource demand among the multicast group members of a first cell. According to a first variant, only the single first group member having the highest resource demand among all members of the multicast group that are located in and/or assigned to the first cell is selected in step 102. According to a further variant, the multicast group members in the first cell are ranked according to their resource demands in the first cell, and two or more of the top ranked group members (i.e., the members having the highest resource demands) are selected for a joint assignment.

In a second step 104, for each cell of a cluster of selected cells the relative resource increase if the one or more first group members selected in step 102 were assigned to this particular cell is determined. The relative resource increase is determined in relation to a second group member having the highest resource demand in this cell. If the cell considered in step 104 is a second cell different from the first cell, the second group member absolutely having the highest resource demand in this second cell will be selected. On the other hand, if step 104 is performed in relation to the first cell, the second group member will be the group member having the highest resource demand in the first cell if the one or more first group members selected in step 102 are disregarded for the moment. In this case the second group member will be the group member in the first cell having the second, third, etc. highest resource demand (depending on the number of first group members selected in step 102).

Step 104 may be performed in relation to a cluster of cells that consists of such cells to which the one or more first group members determined in step 102 could potentially be assigned. The cluster of cells considered in step 104 may be a subset of the total cells of the radio network.

The relative resource increase determined in step 104 may be positive or zero. The resource increase determined in step 104 is relative in that not (only) the absolute resource demand of the one or more first group members in the cell considered in step 104 is determined, but the difference between the resource demand of the group member having the highest resource demand in a cell before the assignment of the one or more first group members to this cell on the one hand and the resource demand in this cell of the one or more first group members on the other hand.

Once step 104 has been performed in relation to a plurality of cells, the method proceeds with step 106. In step 106, the one or more first group members selected from the first cell are assigned to the cell that is associated with the minimum (compensated) relative resource increase. Step 106 encompasses assigning the first group members to the first cell if it is determined in step 104 that keeping the one or more first group members in the first cell would actually lead to a minimum (compensated) relative resource increase compared with an assignment to any other cell considered in step 104.

The assignment in step 106 may be performed with respect to various cell structures. In the case of a hierarchical cell structure, step 106 may be configured such that if repeatedly performed, the assignments will always occur on the same hierarchy layer (e.g., on either a microcell layer or on a macrocell layer). It can thus be ensured that all members of the multicast group will be confined to the same hierarchy layer. Alternatively, step 106 may be performed such that the members of a particular multicast group are distributed across two or more hierarchy layers (e.g., if such a cross-layer distribution helps to maximize the network capacity).

Practising the method embodiment shown in FIG. 1 ensures that a first group member (or a set of first group members) is always assigned to that cell where it causes the smallest relative (or differential) resource increase. In the multicast scenario it is advantageous (and often necessary) to consider the relative resource increase instead of an absolute resource demand as in each cell a plurality of group members can exist. If only one or a few of the group members located in a particular cell will leave that cell, the multicast group will still consume resources in that cell. On the other hand, if a member of the multicast group is assigned to a cell in which already other members of the multicast group exist, the resource increase associated with this new assignment will not be the absolute resource demand (e.g., base station transmit power) of this newly assigned member but the difference (if any) between this resource demand and the highest resource demand of any multicast group member previously assigned to this cell.

Likewise, the resources freed in a particular cell if a multicast group member having the highest resource demand is leaving the group will generally not equal the resource demand of the leaving group member but will equal the difference between the resource demand of the leaving group member and the resource demand of the group member staying in the cell and having the next highest resource demand among all multicast group members staying in the cell. While in the above description only an assignment of a single group member has been considered, it will be apparent that the same mechanisms can be applied to a set of two or more group members (i.e., to the joint assignment of several group members). In such a scenario a set of group members may be assigned to the cell for which the aggregated relative resource increase or relative compensated resource increase is minimum.

To exemplify the method embodiment of FIG. 1, a further method embodiment derived therefrom will now be described for the case of a multicast group served in (at least) two cells of a radio network. In this further embodiment, a hand-over decision between two spatially overlapping and/or hierarchically related cells will be described in relation to a single group member. This embodiment again makes use of the fact that the resource demand of a multicast group for in individual cell is determined by the consumption of the group member having the highest resource demand in this cell.

In a first step of the further method embodiment, the multicast group members served in a first and in a second cell are ranked according to a demand of a resource they create in the respective cell. For the top ranked multicast group member in the first cell a relative resource change is determined in the first and in the second cell if this group member would be switched from the first to the second cell. In other words, in the first cell the difference between the resource demand created by the top ranked group member and a resource demand of the second ranked group member is determined, and in the second cell a difference between the resource demand that would be created in the second cell by the member top ranked in the first cell and the actual resource demand that is created by the top ranked member in the second cell is determined. If the top ranked member in the first cell would free more resources in the first cell than it would additionally consume in the second cell, then the top ranked member in the first cell is re-assigned from the first cell to the second cell (meaning that a switching or a hand-over from the first to the second cell will occur).

An apparatus embodiment 200 of the present invention is shown in FIG. 2. The apparatus 200 is configured to carry out the method embodiments described above in context with assigning one or more members of a multicast group to cells of a radio network. The apparatus 200 comprises a first determination unit 202 with program code portions for determining one or more first group members having the highest resource demand among the multicast group members in the first cell. The first determination unit 202 communicates with a second determination unit 204. The second determination unit 204 comprises program code portions for determining for each cell, including the first cell but disregarding the one or more first group members therein, and in relation to a second group member having the highest resource demand in this cell, the relative resource increase if the one or more first group members were assigned to this cell. An assignment unit 206 communicates with both the first determination unit 202 and the second determination unit 204. The assignment unit 206 comprises program code portions for assigning the one or more first group members selected by the first determination unit 202 to the cell associated with a minimum relative resource increase (or a minimum compensated relative resource increase) output by the second determination unit 204.

The apparatus 200 shown in FIG. 2 may be part of a radio network system such as a WCDMA system or a GPRS system. Such radio network systems usually comprise one or more base stations BSs and a plurality of mobile terminals MTs that are served by the one or more BSs. In a multicast scenario, the MTs are grouped into one or more multicast groups. The individual members of a particular multicast group may be located in different cells of the radio network. The resource demand (or resource consumption) $R_j$ of an individual multicast group member in cell j is mainly determined by the path gain $G_j$ between $MT_j$ and the base station $BS_j$ serving $MT_j$ in cell j. There are additional factors such as the multipath profile of the radio channel and intercell interference that also influence the resource demand $R_j$, but the path gain $G_j$ is in most cases the dominant factor.

In a simplified approach it can be assumed that the resource demand $R_j$ (e.g., measured In W) of $MT_j$ in cell j can be expressed as $$R_j = a*10^{(-G_j)} \tag{1}$$

with "a" being a constant factor.

The path gain $G_j$ (e.g., measured in dB) can be written as $$G_j = P_j - Pt_j \tag{2}$$

with $P_j$ being the received power at $MT_j$ of the common pilot channel CPICH and $Pt_j$ being the CPICH transmit power. Assuming that $Pt_j$ is equal for all cells, this common power may be denoted by Pt. In this case the path gain $G_j$ of $MT_j$ to cell j becomes $G_j = P_j - Pt$. Other methods for estimating the resource demand or resource consumption may, of course, be used in addition or alternatively. Such alternative estimation methods may be based on a determination of the signal-to-noise ratio, on the number of bits added for error protection and/or on the required bandwidth (which increases with the number of bits added for error protection).

As has been explained above (see, e.g., step 106 of FIG. 1), the assignment of multicast group members to individual cells may be based on a determination of the minimum relative resource increase, which again may be derived from the involved $R_j$ values (or $G_j$ values). Alternatively, the assignment may be based on the minimum compensated (or adjusted) relative resource increase. To this end a compensation parameter may be defined that increases the flexibility and controllability of the cell assignment.

In the following, compensation parameters in the form of cell individual offsets (CIOs) will be described as one compensation example. In order to illustrate the mechanism associated with the CIO values, a CIO based unicast cell load balancing scenario will be described first. The unicast mechanisms described hereinafter will then be extended to the multicast case.

In WCDMA systems for example, cell load sharing may be implemented by moving the cell boarders via an adjustment of the CIO values. The CIO values may be signalled to the MTs in an RRC message "measurement control" used for cell quality comparisons in the MTs. The "measurement control" message additionally includes information about the one or more cells a particular MT is expected to monitor, measurement parameters etc. The message thus defines the quantities a particular MT is expected to measure and report. For MTs on dedicated channels, the radio network can make hand-over decisions based on the measurements reports from MTs. The CIO values may also be transmitted in an RRC message "system information" and may then be used for autonomous cell selection and re-selection by MTs on common channels.

Figure 3:
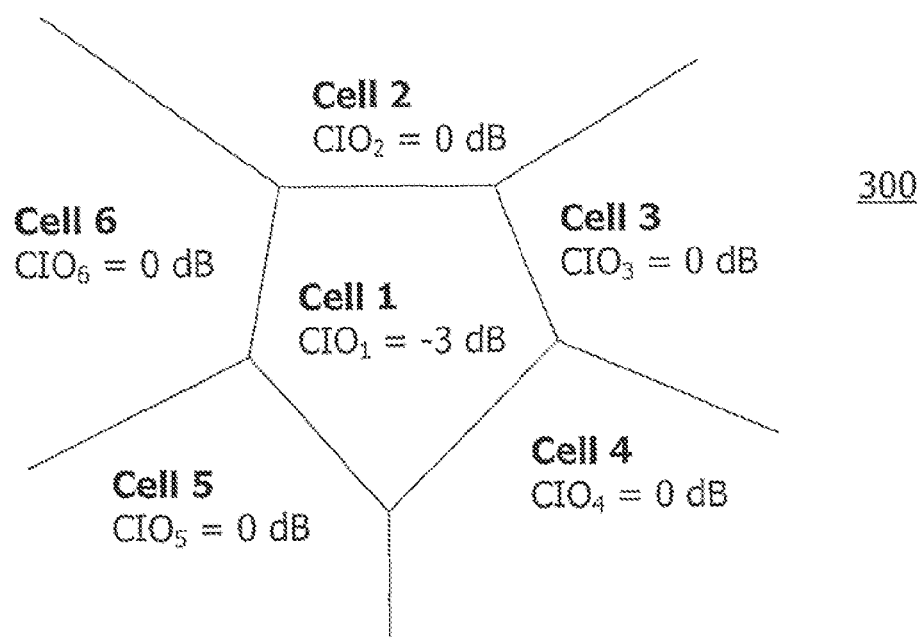
FIG. 3 is a diagram illustrating a cellular radio network and the setting of compensation parameters in accordance with the present invention.

The unicast cell load balancing mechanism will now be explained in more detail with reference to FIG. 3. FIG. 3 shows a cellular radio network 300 with six cells j to which individual offset values $CIO_j$ have been attributed. Assume that the Initial CIO value of each cell 1 to 6 is initially set to 0 dB. Assume further that each MT is configured to select or to be assigned to the cell j with the largest $P_j + CIO_j$ value (which translates to the largest $G_j + CIO_j$ value in the case the CPICH transmit power $Pt_j$ is assumed to be equal for all cells).

If cell 1 is serving so many MTs that the cell resource (e.g., BS transmit power) is close to its maximum, the CIO value of cell 1 may be reduced (e.g., to −3 dB as shown in FIG. 3). In this case the cell quality comparisons made by the MTs will favour the neighbouring cells 2, 3, 4, 5, 6 (assuming that the respective $P_j$ values are approximately the same). Accordingly, the MTs will report to the radio network that cell 1 is 3 dB worse than each of cells 2 to 6. This initiates a hand-over (or re-assignment) from cell 1 to any one of the neighbouring cells 2 to 6 of cell 1 for all MTs that are on a dedicated channel and that are close to the boarder of cell 1. MTs on common channels will also deduct 3 dB from the cell quality measurement of cell 1 in their autonomous cell (re-)assignment process. As a result of these two mechanisms, a plurality of MTs in cell 1 will switch to one of the neighbouring cells 2 to 6.

Instead of selectively reducing the CIO value of cell 1 one could of course also keep the CIO of cell 1 at 0 dB and attribute positive CIO values to cells 2 to 6 in order to direct assignments from cell 1 to any one of its neighbouring cells 2 to 6. The decisive parameter is the difference between the CIO value of cell 1 and the CIO values of its neighbouring cells 2 to 6.

In FIG. 3, the CIO decrease of 3 dB in cell 1 could be illustrated as a shrinking of cell 1 and a broadening of cells 2 to 6. It should be noted that for purposes of enhancing the clarity of FIG. 3, no overlapping (or soft hand-over) regions are illustrated. Of course, in reality the soft hand-over regions (not the cell boarders as such) will move in response to load sharing mechanisms.

Now the hand-over of multicast members will be considered. Noting that the selection based on the largest $G_j+CIO_j$ is equal to a selection based on the largest $10^{\wedge}(G_j+CIO_j)/10$, it follows from equation (1) that $$10^{\wedge}(G_j+CIO_j)/10 = 10^{\wedge}(G_j/10)*10^{\wedge}(CIO_j/10) = a/R_j * 10^{\wedge}(CIO_j/10) \quad (3)$$

It follows that a cell assignment based on the resource demand has to follow a rule which states that the cell j for which the compensated resource demand $R_j*CIO_j'$ is minimal has to be selected, with $$CIO_j' = a/10^{\wedge}(-CIO_j/10). \quad (4)$$

In the following only the $CIO_j'$ values will be considered further. In order to simplify the notatation, the hash in $CIO_j'$ will be omitted. It should, however, be kept in mind that the $CIO_j$ values used hereinafter actually denote the $CIO_j'$ values (and are no longer measured in dB).

Using $CIO_j$ as an adaptive compensation parameter in relation to the received power $P_j$ of the CPICH (or the path again $G_j$), the cell selection rule (also for the multicast scenario) is advantageously defined such that the cell j is selected for which $R_j \times CIO_j$ is minimal. It now becomes apparent what the cell load balancing principle described above inherently does: each multicast group member MT compares the resource demand it would cause to each of a set of candidate cells that can serve the MT. If all $CIO_j$ values were equal, then the MT would simply select the cell j in which it would cause to lowest resource consumption. However, if this is the case for too many MTs in a particular cell, this cell would become overloaded, so that the cell has to force MTs to other cells by appropriately setting its $CIO_j$ value (although the resource demand of these MTs will be higher in the other cells). This principle applies to both the unicast and the multicast scenario.

The CIO setting mechanism can be further illustrated by the following example. Assume that there are only two cells with identical path gains $G_1=G_2$. In this case only the parameter $CIO_{12}=CIO_1/CIO_2$ needs to be considered. By adjusting this parameter from 0 to ∞, the assignment of MTs is changed from all MTs beings assigned to cell 1 to all MTs being assigned to cell 2. This effect also applies if the two cells belong to different hierarchy layers. In this case the compensation parameter $CIO_{12}$ (and in general $CIO_j$) can be used to change the load between the two cell layers.

In the following the principles set forth above will be applied to a further method embodiment.

For a set of multicast group members in a particular cell, the resource demand of the entire set is in most cases determined by the radio propagation conditions of one single member in the group. This is generally the member m that would have the highest resource demand $R_{j,m}$ in a cell j if all members in the set were served by individual unicast channels instead of the joint multicast channel. In fact, the resource demand of the whole set of members of the multicast group in cell j can be approximated by $R_{j,m}$. Keeping this in mind, the following method embodiment will be described in relation to an initial assignment phase first that is followed by a re-assignment phase.

In an initial assignment phase, one or more members of a multicast group request to join the multicast group, or the multicast group is set up from the scratch. According to the principle of an assignment based on the minimum compensated relative resource increase, a new member m selects a cell j for which the value $$R_{j,m}' = \max(0,(R_{j,m}-R_{j,o}))*CIO_j \quad (5)$$

is minimal (note that the factor $CIO_j$ can be omitted if the assignment is based on determining the cell with the minimum non-compensated relative resource increase).

In the above equation (5), $R_{j,o}$ is the resource demand of the member o that is in the same multicast group as the member m and that has already been assigned to cell j and that determines in cell j the resource demand of the multicast group to which the member o belongs (i.e., member o has the highest resource demand among the multicast group members in cell j). If $R_{j,m}'$ is zero for more than one cell, then the new multicast group member m selects any one of these cells.

Equation (5) clearly shows the major difference between the multicast scenario and the unicast hand-over procedure explained above. In the multicast case the cell assignment (additionally) depends on the values $R_{j,o}$. In other words, the assignment of a new multicast group member (and also the re-assignment described below) depends on the previous assignments of other members of the same multicast group. In the initial assignment phase, therefore, the finial assignment of the multicast group members to cells after some members of the same multicast group have selected a cell depend on the order in which the previous members have made their selection decision. In terms of the network capacity (e.g., in terms of the number of multicast group members that can not be assigned due to cell overload), the initial assignment may be better for some assignment order than for some other assignment order. In order to find the (at least temporarily) best assignment, re-assignment mechanisms may be carried out once the initial assignment has been performed. Such mechanisms start when all members of a particular multicast group have been assigned (here members are considered to be (initially) assigned even if this overloads one or more cells).

In the following, a re-assignment mechanism that aims at reducing the overall resource demand will be illustrated. The illustrated re-assignment mechanism may be combined with the initial assignment mechanism described above or any other mechanism that may be used to find an initial assignment.

The re-assignment mechanism starts with selecting a particular cell j and a particular multicast group having group members assigned to this cell j. The mechanism then tries to switch group members from cell j to other cells to increase network capacity.

In a first step, an order is introduced among the group members in cell j by giving a group member determining the resource demand of a multicast group fraction in cell j the highest rank and then (fictitiously) removing it from cell j. The remaining group members all have a lower resource demand, and the group member now determining the resource demand of the multicast group fraction in cell j is given the second rank and is thereafter (fictitiously) removed from cell j as well. This process is repeated until all group members in cell j have been assigned a rank. The ranking process may be performed for multicast group fractions in other cells also.

The further steps will depend on the decision whether the assignment is to be performed on a member-by-member basis or if group member sets can be assigned jointly. Under certain circumstances the joint assignment may be more efficient in terms of increasing the network capacity in comparison with the assignment of single group members. Accordingly, the following approach is described for a joint assignment scenario.

After the ranking of the group members has been performed, it is determined if the group member m having the highest rank in cell j shall be assigned to cell k. In order to find out if there exist further group members having a lower rank in cell j but that should be assigned together with the highest ranked group member to cell k, it is determined if any of these further group members can be assigned to cell k without further increasing the resource demand in cell k (compared with the situation that group member m was assigned alone). The resource demand of the MT with rank r=1 in cell i is denoted $R_{i,o}$. The resource demand $R_{k,o}$ denotes the absolute resource demand in cell k before MT m is tentatively switched to cell k.

An algorithm variable denoted $R_{k,\,max}$ indicative of the tentative maximum resource demand in cell k is initialised to:

$$R_{k,max}=R_{k,o} \quad (6)$$

In order to test if the MT m=0 of rank r=1 (i.e., that determines the resource consumption $R_j$ in its group) shall be switched to cell k, it is tentatively assumed that this MT is switched to cell k.

The associated decrease in resource consumption in cell i is:

$$R'_0=\max(0,1(R_j-R_{m+1}))*CIO \quad (7)$$

Next the tentative maximum resource demand in cell k is updated if the MT m, if switched to cell k, would cause a larger resource demand, i.e.:

$$R_{k,max}=\max(R_{k,max},R_{kim}) \quad (8)$$

The associated increase in resource consumption in cell k is:

$$R'_{k,im}=\max(0,(R_{k,max}-R_{k,0}))*CIO_k \quad (9)$$

The difference $$R'_{k,m}=R'_{km}-R'_m \quad (10)$$

is a measure of the increase of the sum of the absolute resource demand in cells i and k that would result from a switching of all MTs of rank r<=m from cell i to k.

Next, the MT of rank m:=m+t in cell i is considered, until all MTs in cell i have been considered, and for each the above 3 equations are evaluated again.

Then, the steps above are repeated for each cell k that is a candidate for switching.

Finally, the minimum of all $R'_{k,m}$ is selected and the corresponding indices k and m are denoted kmin and mmin. All MTs of rank r≦mmin are switched to cell kmin. All the group members that could be assigned to cell k form a group member set $S_{j,k}$. The first group member that cannot be switched to cell k any more according to the above rules is denoted as group member n.

For the group members remaining in cell j the overall resource consumption does not depend on whether these group members are assigned to cell j or to cell k. In the present embodiment it is assumed that these group members remain assigned to cell j.

Once the group member set $S_{j,k}$ has been determined, compensated relative resource increases are calculated and compared with each other. The switching of the group members in the set $S_{j,k}$ is only considered further if the condition $$(R_{k,m}-R_{k,o})*CIO_j<(R_{j,m}-R_{j,n})*CIO_k \quad (11)$$

holds.

Here, $R_{k,o}$ denotes the resource demand of group member o that has already been assigned to cell k and that determines in cell k the resource demand of the multicast group to which the group member o belongs. $R_{j,n}$ denotes the resource demand of the group member n in cell i that is the first to remain in cell j (and that is therefore not contained in $S_{j,k}$). In other words, an assignment of the group members contained in $S_{j,k}$ is only considered further if the assignment of $S_{j,k}$ would free more resources in cell j than would be additionally consumed in cell k.

The previously described procedure for cell j and cell k is then repeated by considering all further cells i in addition to of cell k. Next, all values $$R_{i,m}'=(R_{i,m}-R_{i,n})*CIO_i \quad (12)$$

are compared and the group members contained in the set $S_{j,h}$ are assigned to cell h=i for which $R_{i,m}'$ is minimum. Thereafter, the re-assignment process described above is repeated (in an inner loop) but now considering the group members that have remained in cell j (i.e., that are not contained in $S_{j,h}$). The repetitions are aborted as soon as no more group members of cell j can be assigned to any other cell according to the rules outlined above.

In a further, outer loop, the re-assignment process is repeated for each cell j. In this regard a strategy may be implemented that determines the order in which cells are considered in this outer loop. A further strategy may be implemented in relation to an (adaptive) setting of the CIO values to influence the cell assignment on a cell-by-cell basis taking into account additional constraints such as the maximum cell load. In both the inner and the outer loop, the re-assignment mechanism aims at minimizing the sum of the total resource demand or consumption of the considered multicast group in each cell.

As has become apparent from the above, the invention allows to make a more efficient use of available network capacity. More specifically, the invention reduces the blocking rate of multicast groups in multilayer or other cellular radio networks, given a particular number of multicast groups that need to be served. Accordingly, the invention increases the network capacity in terms of the number of multicast groups for a predefined blocking rate limit.

While the current invention has been described in relation to its preferred embodiments, it is to be understood that this disclosure is only illustrative. Accordingly, it is intended that the Invention be limited only by the scope of the claims appended hereto.

The invention claimed is:

1. A method of assigning one or more members of a multicast group to cells of a radio network, the method comprising the steps of:
   a) determining among multicast group members in a first cell one or more first group members having the highest resource demand in the first cell;
   b) determining for each cell of a cluster of cells, including the first cell but disregarding the one or more first group members in the first cell, and in relation to a second group member having the highest resource demand in the considered cell, the relative resource increase if the one or more first group members were assigned to this cell; and
   c) assigning the one or more first group members to the cell associated with a minimum relative resource increase or a minimum compensated relative resource increase.

2. The method of claim 1, wherein the cells are hierarchically structured and wherein step c) is permitted to assign the members of the multicast group to cells on different hierarchy layers.

3. The method of claim 1, wherein the cells are spatially overlapping and wherein the steps are performed in relation to group members located in overlapping regions.

4. The method of claim 1, wherein the steps are performed during a re-assignment phase following an initial assignment of the multicast group members to cells of the radio network.

5. The method of claim 1, wherein for an initial assignment of the one or more first group members, steps a) and b) are performed under the assumption that the one or more first group members have not yet been assigned to any cell.

6. The method of claim 1, wherein for a re-assignment of the one or more first group members, step b) comprises determining for the first cell the relative resource increase associated with the one or more first group members in relation to the second group member having the highest resource demand in the first cell after the one or more first group members.

7. The method of claim 1, wherein step b) comprises determining the relative resource increase as the difference in the considered cell between the resource demand of the one or more first group members and the resource demand of the second group member.

8. The method of claim 1, wherein the resource demand is derived from a path gain or a base station transmit power associated with a particular group member or set of group members.

9. The method of claim 1, wherein step a) comprises building a set of two or more first group members, the group member set including the group member having the highest resource demand in the first cell and one or more additional group members having the next highest resource demands in the first cell.

10. The method of claim 1, wherein the group member set includes only such additional group members for which the relative resource increase in step b) does not exceed the relative resource increase associated with the one or more first group members having the highest resource demand in the first cell.

11. The method of claim 1, wherein step b) further comprises calculating for each cell a compensated relative resource increase from the relative resource increase and a compensation parameter.

12. The method of claim 11, wherein the compensation parameter is set for each cell individually.

13. The method of claim 12, wherein the compensation parameter is set to control group member distribution across the individual cells.

14. The method of claim 1, wherein step a) comprises ranking the group members according to their resource demands for each cell individually.

15. The method of claim 14, further comprising repeatedly performing the steps for further first group members or sets of first group members of the first cell in the order of decreasing resource demands.

16. The method of claim 1, further comprising repeatedly performing the steps for group members or sets of group members of the remaining cells.

17. A device for assigning one or more members of a multicast group to cells of a radio network, the device comprising:
   a first determination unit with program code portions stored in a non-transitory computer-readable storage medium, wherein the program code instructs a microprocessor for determining among multicast group members in a first cell one or more first group members having the highest resource demand in the first cell;
   a second determination unit with program code portions stored in a non-transitory computer-readable storage medium, wherein the program code instructs a microprocessor for determining for each cell of a cluster of cells, including the first cell but disregarding the one or more first group members in the first cell, and in relation to a second group member having the highest resource demand in the considered cell, the relative resource increase if the one or more first group members were assigned to this cell; and
   an assignment unit with program code portions stored in a non-transitory computer-readable storage medium, wherein the program code instructs a microprocessor for assigning the one or more first group members to the cell associated with a minimum relative resource increase or a minimum compensated relative resource increase.

* * * * *

UNITED STATES PATENT AND TRADEMARK OFFICE
CERTIFICATE OF CORRECTION

PATENT NO.        : 8,064,375 B2
APPLICATION NO.   : 11/722262
DATED             : November 22, 2011
INVENTOR(S)       : Huschke Page 1 of 1

It is certified that error appears in the above-identified patent and that said Letters Patent is hereby corrected as shown below:

In Column 1, Line 25, delete "In" and insert -- in --, therefor.

In Column 4, Line 19, delete "Initially" and insert -- initially --, therefor.

In Column 8, Line 7, delete "In" and insert -- in --, therefor.

In Column 8, Line 60, delete "Initial" and insert -- initial --, therefor.

In Column 9, Line 41, delete "notatation," and insert -- notation, --, therefor.

In Column 10, Line 62, delete "Illustrated" and insert -- illustrated --, therefor.

In Column 11, Line 63, delete "m:=m+t" and insert -- m:=m+1 --, therefor.

In Column 12, Line 66, delete "Invention" and insert -- invention --, therefor.

Signed and Sealed this
Third Day of April, 2012

David J. Kappos
*Director of the United States Patent and Trademark Office*